US011923890B2

(12) United States Patent
Asai

(10) Patent No.: US 11,923,890 B2
(45) Date of Patent: Mar. 5, 2024

(54) WIRELESS COMMUNICATION APPARATUS, WIRELESS COMMUNICATION SYSTEM, AND COMMUNICATION METHOD

(71) Applicant: CANON KABUSHIKI KAISHA, Tokyo (JP)

(72) Inventor: Hitoshi Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/047,086

(22) Filed: Oct. 17, 2022

(65) Prior Publication Data

US 2023/0060522 A1 Mar. 2, 2023

Related U.S. Application Data

(63) Continuation of application No. 17/316,423, filed on May 10, 2021, now Pat. No. 11,502,719, which is a continuation of application No. 16/844,474, filed on Apr. 9, 2020, now Pat. No. 11,038,548.

(30) Foreign Application Priority Data

Apr. 15, 2019 (JP) ................................ 2019-077096

(51) Int. Cl.
*H04B 1/56* (2006.01)
*H01Q 19/24* (2006.01)
(Continued)

(52) U.S. Cl.
CPC ............... *H04B 1/56* (2013.01); *H01Q 19/24* (2013.01); *H01Q 19/30* (2013.01); *H01Q 21/12* (2013.01); *H04L 5/14* (2013.01)

(58) Field of Classification Search
None
See application file for complete search history.

(56) References Cited

U.S. PATENT DOCUMENTS 4,776,661 A * 10/1988 Handa ................ G02B 6/12004 385/24
5,339,457 A * 8/1994 Kawasaki ............. H03D 7/005 331/107 S
(Continued)

FOREIGN PATENT DOCUMENTS

CN 102823149 A * 12/2012 ........... H01Q 9/0407
CN 205406696 U * 7/2016 ................ H01P 5/18
(Continued)

*Primary Examiner* — Berhanu Tadese
(74) *Attorney, Agent, or Firm* — Canon U.S.A., Inc. IP Division

(57) ABSTRACT

A wireless communication apparatus includes a first conductor and a second conductor that function as a set of electrodes for wireless communication, a third conductor and a fourth conductor that function as another set of electrodes for wireless communication. A difference between a first distance between a centroid of the first conductor and a centroid of the third conductor and a second distance between a centroid of the second conductor and the centroid of the third conductor is less than a width of the first conductor and a width of the second conductor. A third distance between the centroid of the first conductor and a centroid of the fourth conductor is longer than the first distance. A fourth distance between the centroid of the second conductor and the centroid of the fourth conductor is longer than the second distance.

15 Claims, 7 Drawing Sheets

(51) Int. Cl.
*H01Q 19/30* (2006.01)
*H01Q 21/12* (2006.01)
*H04L 5/14* (2006.01)

(56) References Cited

U.S. PATENT DOCUMENTS 5,349,598 A * 9/1994 Ouchi .................. H01S 5/1032 372/45.01
5,521,735 A * 5/1996 Shimizu ........... H01L 29/66977 257/27
5,613,020 A * 3/1997 Uchida ............. G02B 6/12004 385/9
5,648,978 A * 7/1997 Sakata .................. B82Y 20/00 372/27
6,211,799 B1 * 4/2001 Post .................... H04B 13/005 455/100
6,884,318 B2 * 4/2005 Suzuki ............. H01L 21/67069 257/E21.252
7,777,962 B2 * 8/2010 Bowers ................. B82Y 20/00 359/900
7,830,618 B1 * 11/2010 Bowers ................. G02B 27/40 359/680
7,869,131 B2 * 1/2011 Bowers ................. B82Y 20/00 359/642
8,164,837 B2 * 4/2012 Bowers ............. G02B 27/0012 359/721
8,638,504 B2 * 1/2014 Bowers ................. G02B 27/40 343/700 R
8,638,505 B2 * 1/2014 Bowers ................. G02B 1/007 343/700 R
8,730,591 B2 * 5/2014 Bowers .................. G02F 1/292 359/721
8,749,496 B2 * 6/2014 Chang ................ G02F 1/13338 345/173
8,773,775 B2 * 7/2014 Bowers ................. G02B 1/007 343/700 R
8,773,776 B2 * 7/2014 Bowers ............. G02B 27/0081 343/700 R
8,817,380 B2 * 8/2014 Bowers ................... G02B 3/00 343/700 R
8,837,058 B2 * 9/2014 Bowers ............. H01Q 15/0086 359/672
8,866,787 B2 * 10/2014 Chang ................ G06F 3/04166 345/173
8,917,637 B2 * 12/2014 Kanda .................. H04W 16/28 370/277
9,001,082 B1 * 4/2015 Rosenberg .......... G06F 3/04166 178/18.05
9,019,632 B2 * 4/2015 Bowers ................. G02B 27/40 343/700 R
9,270,004 B2 * 2/2016 Ohashi ................... H01P 5/107
9,276,553 B2 * 3/2016 Suzuki ................... H02J 50/90
9,331,663 B2 * 5/2016 Suzuki ................... H03H 7/40
9,337,798 B2 * 5/2016 Suzuki ................... H02J 50/12
9,459,746 B2 * 10/2016 Rosenberg ............. G01L 1/146
9,465,477 B2 * 10/2016 Rosenberg .......... G06F 3/04166
9,582,098 B2 * 2/2017 Rosenberg ........ G06F 3/041661
9,705,169 B2 * 7/2017 Ohashi ................. H01P 11/001
9,736,928 B2 * 8/2017 Frey ..................... H05K 3/4644
9,746,964 B2 * 8/2017 Rosenberg ............. G01L 1/205
9,985,334 B2 * 5/2018 Beaton .................. G02C 7/049
10,073,565 B2 * 9/2018 Rosenberg ........... G06F 3/0446
10,432,029 B2 * 10/2019 Ikefuji ................... H02J 50/80
10,534,478 B2 * 1/2020 Rosenberg ........... G06F 3/0442
10,608,478 B2 * 3/2020 Yamakawa ............ H02J 50/90
10,923,962 B2 * 2/2021 Ikefuji ................... H01F 38/14
10,994,139 B2 * 5/2021 Fayram .................. H02J 50/10
11,038,548 B2 * 6/2021 Asai ........................ H04B 1/38
11,057,078 B2 * 7/2021 Tamaki ............... H04B 5/0031
11,068,118 B2 * 7/2021 Rosenberg .......... G06F 3/04146
11,129,985 B2 * 9/2021 Fayram ............. A61N 1/36185
11,502,719 B2 * 11/2022 Asai ...................... H01Q 19/24
2010/0009638 A1 * 1/2010 Saito ................... H01Q 1/2258 455/73
2011/0038649 A1 * 2/2011 Miyabe ............. G03G 15/0896 399/119
2011/0187868 A1 * 8/2011 Chang ................... G01H 9/006 348/163
2011/0222585 A1 * 9/2011 Washiro ................. H01P 5/085 375/E1.001
2011/0304577 A1 * 12/2011 Brown ............... G06F 3/03545 345/174
2012/0019075 A1 * 1/2012 Cho ....................... H02J 50/12 29/605
2012/0188328 A1 * 7/2012 Takezawa .......... G06K 15/1209 347/247
2013/0299214 A1 * 11/2013 Frey ...................... H05K 3/061 174/253
2014/0035398 A1 * 2/2014 Ruan ..................... H02K 26/00 310/38
2014/0043198 A1 * 2/2014 Shimura ................. H01Q 5/10 343/843
2014/0175896 A1 * 6/2014 Suzuki ................... H02J 50/12 307/104
2014/0191819 A1 * 7/2014 Suzuki ................... H02J 50/12 333/17.3
2014/0266477 A1 * 9/2014 Sekiguchi ............... H03B 7/08 331/96
2014/0375524 A1 * 12/2014 Nago ...................... H01Q 1/36 343/866
2015/0229137 A1 * 8/2015 Suzuki ................... H02J 50/12 333/32
2015/0229289 A1 * 8/2015 Suzuki ................... H01F 38/14 333/32
2015/0305149 A1 * 10/2015 Kondo .................. H05K 3/284 361/767
2016/0072544 A1 * 3/2016 Bosenko ............. H04B 5/0037 455/78
2016/0079773 A1 * 3/2016 Shinoda ................. H02J 50/40 320/108
2016/0169746 A1 * 6/2016 Koyama .................. G01J 5/59 250/338.1
2016/0218566 A1 * 7/2016 Bunsen ................... G01V 3/02
2016/0241047 A1 * 8/2016 Eguchi ................... H02J 50/40
2017/0106759 A1 * 4/2017 Yamakawa ............ H02J 50/70
2017/0115511 A1 * 4/2017 Beaton .................... G02C 7/04
2017/0155862 A1 * 6/2017 Kobayashi ........ H01L 27/14609
2017/0176916 A1 * 6/2017 Kobayashi ........ H02M 3/33571
2017/0303393 A1 * 10/2017 Frey .................... H05K 1/0306
2018/0085593 A1 * 3/2018 Fayram .................. H02J 50/20
2018/0198490 A1 * 7/2018 Yukimasa ............ H04L 25/085
2018/0198491 A1 * 7/2018 Shoji ................... H04B 5/0037
2019/0018544 A1 * 1/2019 Rosenberg ........... G06F 3/0441
2020/0203823 A1 * 6/2020 Shoji ................ H02J 13/00022
2020/0313293 A1 * 10/2020 Morita .................. H01Q 1/125
2020/0328775 A1 * 10/2020 Asai ......................... H04L 5/14
2020/0373968 A1 * 11/2020 Tamaki ............... H04B 5/0075
2021/0266033 A1 * 8/2021 Asai ......................... H04L 5/14
2021/0297112 A1 * 9/2021 Tamaki ............... H04B 5/0031
2022/0011892 A1 * 1/2022 Rosenberg .......... G06F 3/04166
2023/0060522 A1 * 3/2023 Asai ........................ H04B 1/38

FOREIGN PATENT DOCUMENTS

CN 109565389 B * 11/2021 ............... H04B 3/36
CN 111835374 B * 8/2022 ............. H01Q 19/24
JP 2018113673 A 7/2018
JP 2018113673 A * 7/2018 ............. F01L 3/205
KR 20140035398 A 3/2014
WO WO-2009107532 A1 * 9/2009 .......... H01P 1/20345
WO WO-2012155135 A2 * 11/2012 ............. G06K 19/07
WO WO-2012155135 A3 * 3/2013 ............. G06K 19/07
WO WO-2014163600 A1 * 10/2014 ............... H01Q 1/36
WO WO-2018113673 A1 * 6/2018 ............. G06F 16/00

* cited by examiner 100
110
111
112a
112b
113a
113b
114
120
121
122a
122b
123a
123b
124
150
151
TX+
TX−
RX+
RX−
IN+
IN−
OUT+
OUT−
Vi
Vo
Vr Vi+_u
Vi−_u
Vr+_d
Vr−_d
Vr_d
TIME Vr_u
Vr+_u
Vr−_u
Vi_d
Vi+_d
Vi−_d
123b
123a
112b
112a
122b
122a
113b
113a
150
151
Vi_u
Vi+_u
Vi−_u
Vr_d
Vr+_d
Vr−_d Vr_u
Vr+_u
Vr−_u
123a
123b
122a
122b
112a
112b
113a
113b
150
151
Vi_d
Vi+_d
Vi−_d
Vr+_d
Vr−_d
Vr_d
Vi+_u
Vi−_u
Vi_u Vi+_u
Vi−_u
Vr+_d
Vr−_d
Vr_d
TIME 500
112a
112b
501
113a
113b 500
112a
112b
501
113a
113b
La
Lb 500
112a
112b
501
113a
113b GND
112
La
Lb
501
113a
113b GND
112
La
Lb
501
113a
113b

WIRELESS COMMUNICATION APPARATUS, WIRELESS COMMUNICATION SYSTEM, AND COMMUNICATION METHOD

CROSS-REFERENCE TO RELATED APPLICATIONS

The present application is a continuation of U.S. patent application Ser. No. 17/316,423, filed on May 10, 2021, which is a continuation of U.S. patent application Ser. No. 16/844,474, filed on Apr. 9, 2020, that issued as U.S. Pat. No. 11,038,548 on June 2021, 2015, which claims priority from Japanese Patent Application No. 2019-077096 filed Apr. 15, 2019, which are hereby incorporated by reference herein in their entireties.

BACKGROUND

Field

The present disclosure relates to a wireless communication apparatus and a wireless communication system.

Description of the Related Art

A physical connector or a harness can be used to connect a communication interface between electronic circuit substrates or modules. However, it can be difficult for a robot or other automated system to automatically connect such connectors or harnesses and thus installing the connections often requires manual human work. Further, the use of connectors for establishing connection between devices can impose physical constraints of arrangement or can require a special mechanism such as a cover to conform to a waterproof standard. To solve these problems, Japanese Patent Laid-Open No. 1-5235 and Japanese Patent Laid-Open No. 2016-29785 disclose a wireless communication system for non-contact data transmission using electric field coupling.

According to Japanese Patent Laid-Open No. 1-5235 and Japanese Patent Laid-Open No. 2016-29785, a coupler of a transmitter and a coupler of a receiver are arranged to be close to one another such that they can achieve wireless communication with one another using electric field coupling. A set which includes the coupler of the transmitter and the coupler of the receiver are referred to below as a coupler pair.

Two or more coupler pairs are needed for wireless full-duplex two-way communication or multi-lane (multi-system) communication. However, where the coupler pairs are arranged to be close to one another, electric field coupling can occur between the coupler pairs. Such electric field coupling can result in communication interference and can cause problems such as communication errors and communication failure. In order to inhibit such communication interference, a large space is needed to separate the coupler pairs from each other. This factor can greatly restrict the range of structures and designs of a small device, particularly in a case where coupler pairs are installed in the small device.

SUMMARY

Various embodiments of the present disclosure provide a wireless communication apparatus that includes a first conductor and a second conductor that function as a set of electrodes for wireless communication of a differential signal using electric field coupling, between the wireless communication apparatus and another wireless communication apparatus, and a third conductor and a fourth conductor that function as another set of electrodes for wireless communication using electric field coupling, between the wireless communication apparatus and the other wireless communication apparatus. A difference between a first distance between a centroid of the first conductor and a centroid of the third conductor, and a second distance between a centroid of the second conductor and the centroid of the third conductor, is less than a width of the first conductor and a width of the second conductor. A third distance between the centroid of the first conductor and a centroid of the fourth conductor is longer than the first distance. A fourth distance between the centroid of the second conductor and the centroid of the fourth conductor is longer than the second distance.

Further features will become apparent from the following description of various embodiments of the present disclosure with reference to the attached drawings.

DESCRIPTION OF THE EMBODIMENTS

Figure 1:
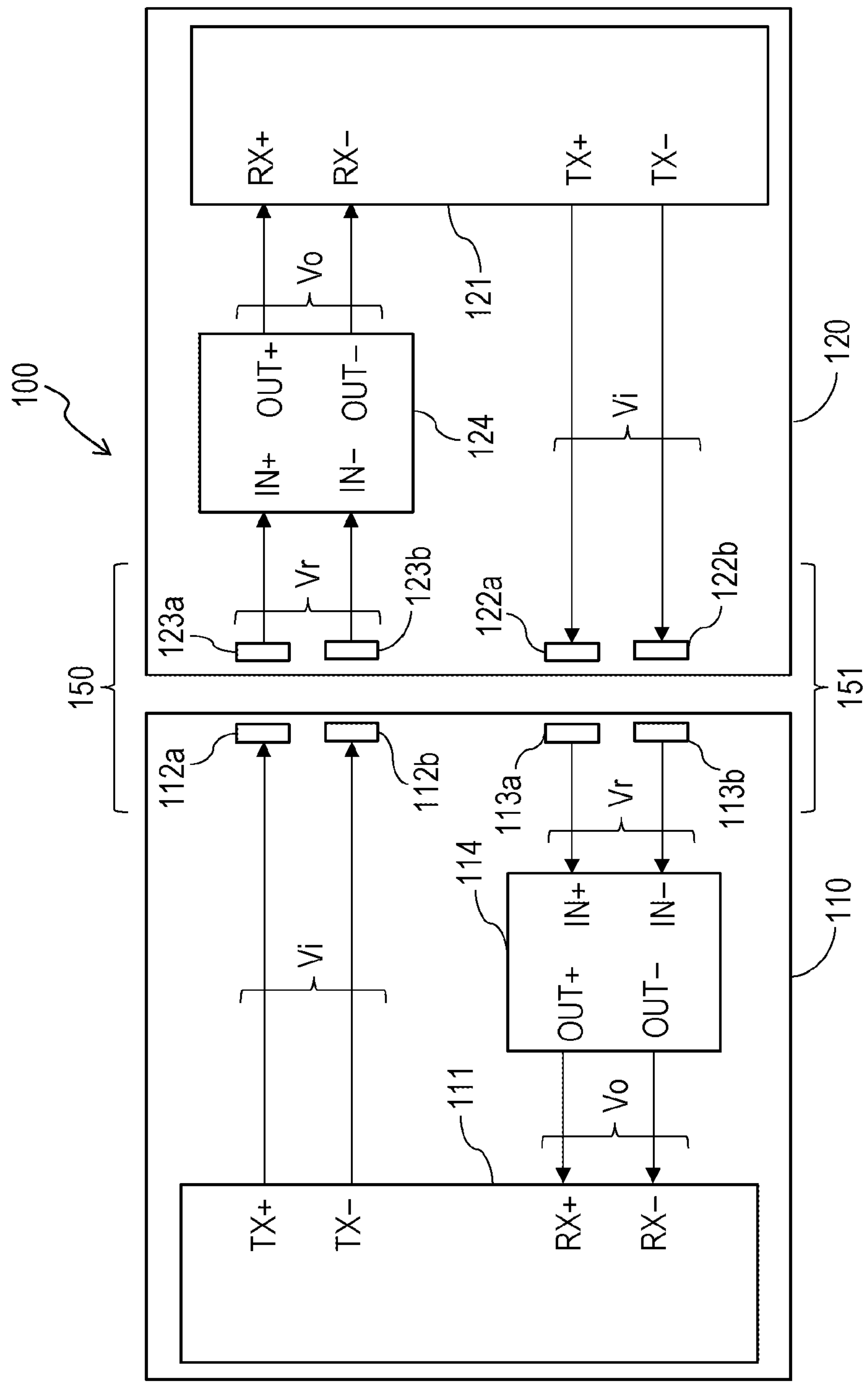
FIG. 1 is a block diagram of an example of the structure of a wireless communication system according to one embodiment.

FIG. 1 is a block diagram showing an example of a structure of a wireless communication system 100 according to one embodiment of the present disclosure. The wireless communication system 100 includes wireless communication modules 110 and 120 and enables wireless full-duplex communication between the wireless communication modules 110 and 120. In the full-duplex communication, the wireless communication modules 110 and 120 can perform transmission and reception at the same time.

The wireless communication module 110 is a wireless communication apparatus and includes a transceiver circuit 111, couplers 112*a*, 112*b*, 113*a*, and 113*b*, and a transformation circuit 114. The wireless communication module 120 is a wireless communication apparatus and includes a transceiver circuit 121, couplers 122*a*, 122*b*, 123*a*, and 123*b*, and a transformation circuit 124.

A coupler pair 150 corresponds to pairs of the couplers 112*a* and 112*b* of wireless communication module 110, and the couplers 123*a* and 123*b* of wireless communication module 110, to be used for transmission from the wireless communication module 110 to the wireless communication module 120. The couplers 112*a* and 112*b* and the couplers 123*a* and 123*b* are conductors that function as electrodes for wireless communication using electric field coupling. The coupler 112*a* of wireless communication module 110 and the coupler 123*a* of wireless communication module 120 are close to each other, face each other, and wirelessly communicate a signal output by a transmission terminal TX+ of the transceiver circuit 111 of wireless communication module 110 using electric field coupling. The coupler 112*b* of wireless communication module 110 and the coupler 123*b* of wireless communication module 120 are close to each other, face each other, and wirelessly communicate a signal output by a transmission terminal TX− of the transceiver circuit 111 of wireless communication module 110 using electric field coupling.

A coupler pair 151 corresponds to pairs of the couplers 122*a* and 122*b* of wireless communication module 120, and the couplers 113*a* and 113*b* of wireless communication module 110, for transmission from the wireless communication module 120 to the wireless communication module 110. The couplers 122*a*, 122*b*, 113*a*, and 113*b* are conductors that function as electrodes for wireless communication using electric field coupling. The coupler 122*a* of wireless communication module 120, and the coupler 113*a* of wireless communication module 110, are close to each other, face each other, and wirelessly communicate a signal output by a transmission terminal TX+ of the transceiver circuit 121 of wireless communication module 120 using electric field coupling. The coupler 122*b* of wireless communication module 120 and the coupler 113*b* of wireless communication module 110 are close to each other, face each other, and wirelessly communicate a signal output by a transmission terminal TX− of the transceiver circuit 121 of wireless communication module 120 using electric field coupling. Each coupler is composed of a metal plate or a copper pattern such as a rigid substrate or a flexible substrate. According to the present embodiment, the coupler 112*a*, the coupler 112*b*, the coupler 113*a*, and the coupler 113*b* of wireless communication module 110 are disposed on the same substrate, and the coupler 122*a*, the coupler 122*b*, the coupler 123*a*, and the coupler 123*b* of wireless communication module 110 are disposed on the same substrate. However, in other embodiments, the couplers may be disposed differently. For example, in other embodiments, the coupler 112*a* and the coupler 112*b* may be disposed on different substrates and the coupler 113*a* and the coupler 113*b* may be disposed on different substrates.

The transceiver circuit 111 of wireless communication module 110 outputs differential transmission signals to the couplers 112*a* and 112*b* of wireless communication module 110 via the transmission terminals TX+ and TX−. The signal output by the transmission terminal TX+ and the signal output by the transmission terminal TX− are input signals Vi and are binary differential signals that have reversed phases. The coupler 112*a* wirelessly transmits the signal output by the transmission terminal TX+ of the transceiver circuit 111 of wireless communication module 110 using electric field coupling to the coupler 123*a* of wireless communication module 120 on the outside therefrom. The coupler 112*b* of wireless communication module 110 wirelessly transmits the signal output by the transmission terminal TX− of the transceiver circuit 111 of wireless communication module 110 using electric field coupling to the coupler 123*b* of wireless communication module 120 on the outside therefrom. The coupler 112*a* and the coupler 112*b* of wireless communication module 110 wirelessly transmit the differential signals output by the transmission terminals TX+ and TX− of the transceiver circuit 111 of wireless communication module 110 to the coupler 123*a* and the coupler 123*b* of wireless communication module 120 on the outside therefrom.

The coupler 123*a* wirelessly receives the signal using electric field coupling from the coupler 112*a* on the outside therefrom. The coupler 123*b* wirelessly receives the signal using electric field coupling from the coupler 112*b* on the outside therefrom. The coupler 123*a* and the coupler 123*b* wirelessly receive the differential signals from the coupler 112*a* and the coupler 112*b* on the outside therefrom.

The signal transmitted by the coupler 123*a* and the signal transmitted by the coupler 123*b* are reception signals Vr. The transformation circuit 124 inputs the signal transmitted by the coupler 123*a* into an input terminal IN+, inputs the signal transmitted by the coupler 123*b* into an input terminal IN−, and outputs differential signals via output terminals OUT+ and OUT−. The signal outputted by the output terminal OUT+ and the signal outputted by the output terminal OUT− are output signals Vo and are binary differential signals that have reversed phases. The transformation circuit 124 shapes the waveform of the reception signals Vr and restores binary output signals Vo. The output signals Vo correspond to the input signals Vi that are outputted from the transceiver circuit 111. The transceiver circuit 121 inputs the signals of the output terminals OUT+ and OUT− of the transformation circuit 124 into reception terminals RX+ and RX− for a reception process.

Similarly, the transceiver circuit 121 outputs differential transmission signals to the couplers 122*a* and 122*b* via the transmission terminals TX+ and TX−. The signal outputted by the transmission terminal TX+ and the signal outputted by the transmission terminal TX− are input signals Vi and are binary differential signals that have reversed phases. The coupler 122*a* wirelessly transmits the signal output by the transmission terminal TX+ of the transceiver circuit 121 using electric field coupling to the coupler 113*a* on the outside therefrom in communication module 110. The coupler 122*b* wirelessly transmits the signal output by the transmission terminal TX− of the transceiver circuit 121 using electric field coupling to the coupler 113*b* on the outside therefrom in communication module 110. The coupler 122*a* and the coupler 122*b* wirelessly transmit the differential signals of the transmission terminals TX+ and TX− of the transceiver circuit 121 to the coupler 113*a* and the coupler 113*b* on the outside therefrom in communication module 110.

The coupler 113*a* wirelessly receives the signal transmitted using electric field coupling from the coupler 122*a* on the outside therefrom. The coupler 113*b* wirelessly receives the signal using electric field coupling from the coupler 122*b* on the outside therefrom. The coupler 113*a* and the coupler 113*b* wirelessly receive the differential signals from the coupler 122*a* and the coupler 122*b* on the outside therefrom in communication module 120.

The signal transmitted by the coupler 113*a* and the signal transmitted by the coupler 113*b* are reception signals Vr. The transformation circuit 114 of inputs the signal transmitted by the coupler 113*a* into an input terminal IN+, inputs the signal transmitted by the coupler 113*b* into an input terminal IN−, and outputs differential signals via output terminals OUT+ and OUT−. The signal output by the output terminal OUT+ and the signal output by the output terminal OUT− are output signals Vo and are binary differential signals that have reversed phases. The transformation circuit 114 shapes the waveform of the reception signals Vr and restores binary output signals Vo. The output signals Vo correspond to the input signals Vi that are outputted from the transceiver circuit 121. The transceiver circuit 111 inputs the signals of the output terminals OUT+ and OUT− of the transformation circuit 114 into reception terminals RX+ and RX− for a reception process.

Figure 2:
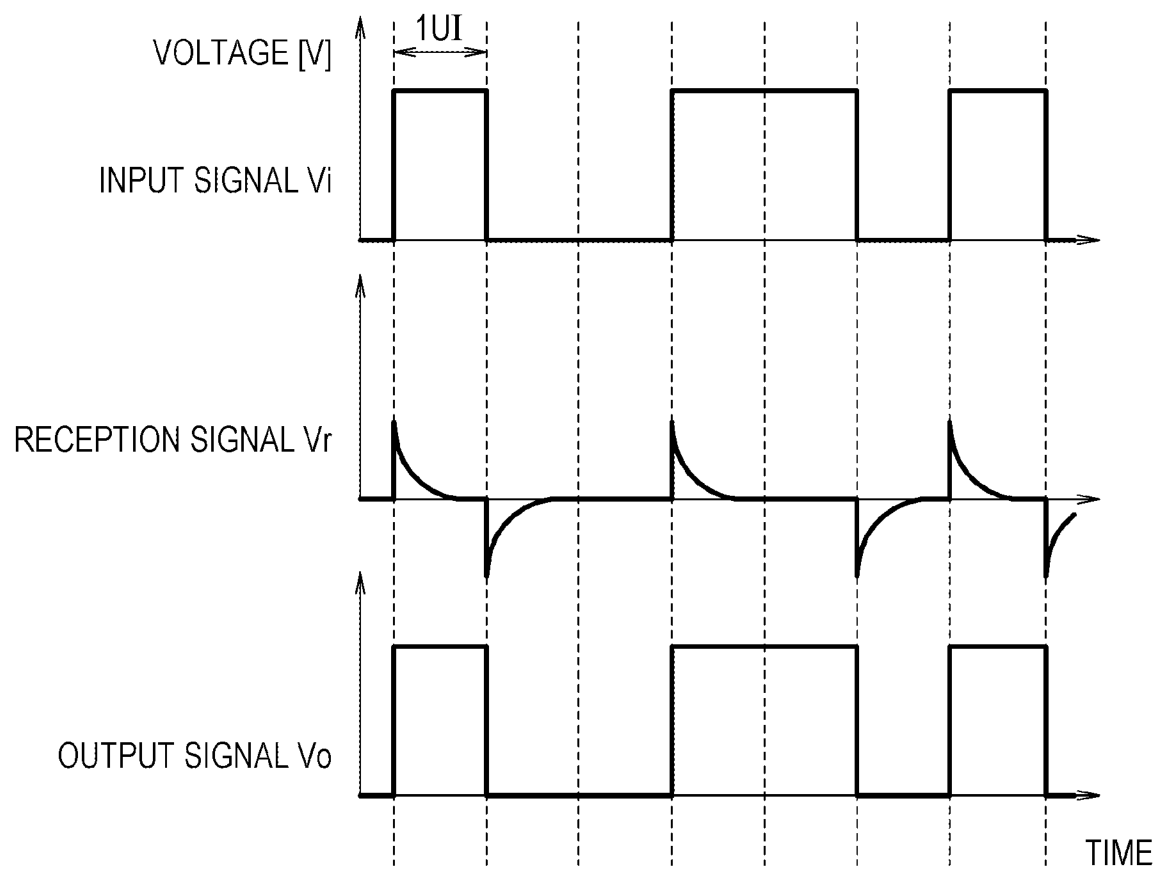
FIG. 2 is a timing chart for a description of an electrical signal to be communicated according to one embodiment.

FIG. 2 is a timing chart illustrating an example of each input signal Vi, each reception signal Vr, and each output signal Vo in FIG. 1. In FIG. 2, the input signal Vi represents the signal output by the terminal TX+, the reception signal Vr represents the signal output by the terminal IN+, and the output signal Vo represents the signal output by the reception terminal RX+. The same is true for the input signal Vi of the terminal TX−, the reception signal Vr of the terminal IN−, and the output signal Vo of the reception terminal RX−.

The input signal Vi and the output signal Vo are binary digital signals. One unit interval (UI) represents the length of a bit in a bitstream of a digital signal. The reception signal Vr is an analog signal.

The following description includes by way of example the input signal Vi, the reception signal Vr, and the output signal Vo in the case of transmission from the wireless communication module 110 to the wireless communication module 120. The same is true for the input signal Vi, the reception signal Vr, and the output signal Vo in the case of transmission from the wireless communication module 120 to the wireless communication module 110.

The input signals Vi are inputted from the transceiver circuit 111 into the couplers 112*a* and 112*b*. The reception signals Vr are inputted from the couplers 123*a* and 123*b* into the transformation circuit 124. The output signals Vo are inputted from the transformation circuit 124 to the transceiver circuit 121.

The transceiver circuit 111 outputs binary digital signals that represent “1” or “0” as the input signals Vi to the couplers 112*a* and 112*b*. The coupler 112*a* and the coupler 123*a* between which electric field coupling occurs have transmission characteristics similar to those of a high-pass filter (HPF) in which coupling is weak in a low band and coupling is strong in a high band. Accordingly, only a high-frequency component of the input signal Vi is transmitted from the coupler 112*a* to the coupler 123*b*, and the coupler 123*b* receives the reception signal Vr. As illustrated in FIG. 2, the reception signal Vr ideally has a waveform obtained by inexact differential of the input signal Vi. The same is true for the couplers 112*b*, 123*b*, 113*a*, 122*a*, 113*b*, and 122*b* as in the couplers 112*a* and 123*a*.

The transformation circuit 124 shapes the reception signals Vr, restores the binary input signals Vi that are outputted from the transceiver circuit 111 and that represent “1” or “0”, and outputs the output signals Vo. For example, the transformation circuit 124 is embodied by a hysteresis comparator. The hysteresis comparator compares the result of subtracting the signal received at the input terminal IN− from the signal received at the input terminal IN+ and a threshold and outputs the output signals Vo. The same is true for the transformation circuit 114 as in the transformation circuit 124. The wireless communication module 110 and the wireless communication module 120 can thus achieve non-contact wireless communication with each other using electric field coupling.

Figure 3B:
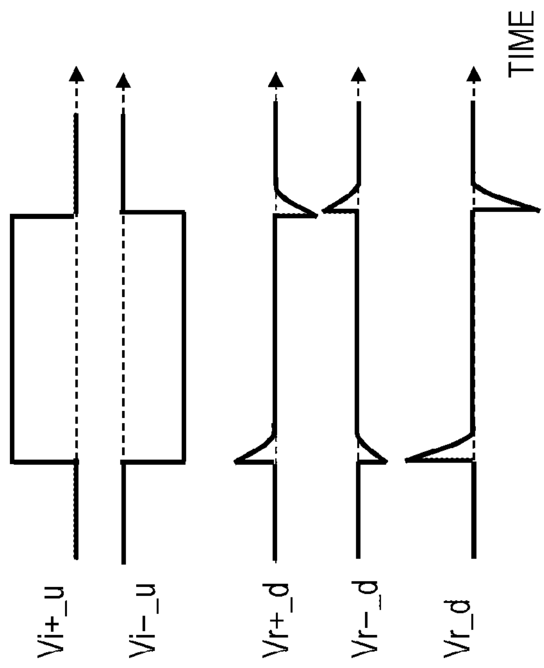
FIG. 3A and FIG. 3B illustrate a problem of coupler arrangement.
Figure 3A:
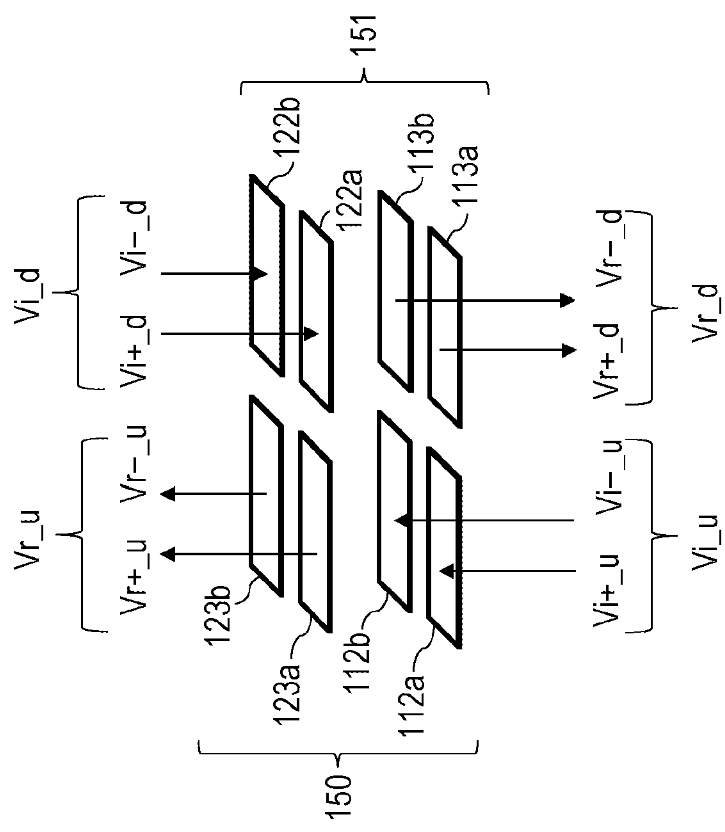

FIG. 3A and FIG. 3B illustrate an example of an arrangement of the couplers 112*a*, 112*b*, 113*a*, 113*b*, 122*a*, 122*b*, 123*a*, and 123*b*. Interference that occurs due to the arrangement of the couplers will be described with reference to FIG. 3A and FIG. 3B. FIG. 3A illustrates the arrangement of the couplers 112*a*, 112*b*, 113*a*, 113*b*, 122*a*, 122*b*, 123*a*, and 123*b*. FIG. 3B illustrates the waveform of a signal to describe the communication interference that occurs in the case of the arrangement of the couplers in FIG. 3A.

The transmission terminal TX+ of the transceiver circuit 111 outputs an input signal Vi+_u to the coupler 112*a*. The transmission terminal TX− of the transceiver circuit 111 outputs an input signal Vi−_u to the coupler 112*b*. An input signal Vi_u is a signal of (Vi+_u)−(Vi−_u).

The coupler 123*a* outputs a reception signal Vr+_u to the input terminal IN+ of the transformation circuit 124. The coupler 123*b* outputs a reception signal Vr−_u to the input terminal IN− of the transformation circuit 124. A reception signal Vr_u is a signal of (Vr+_u)−(Vr−_u).

The transmission terminal TX+ of the transceiver circuit 121 outputs an input signal Vi+_d to the coupler 122*a*. The transmission terminal TX− of the transceiver circuit 121 outputs an input signal Vi−_d to the coupler 122*b*. An input signal Vi_d is a signal of (Vi+_d)−(Vi−_d).

The coupler 113*a* outputs a reception signal Vr+_d to the input terminal IN+ of the transformation circuit 114. The coupler 113*b* outputs a reception signal Vr−_d to the input terminal IN− of the transformation circuit 114. A reception signal Vr_d is a signal of (Vr+_d)−(Vr−_d).

The couplers 112*a*, 112*b*, 113*a*, 113*b*, 122*a*, 122*b*, 123*a*, and 123*b* are rectangular conductors, and the longitudinal directions thereof are parallel to each other. The coupler pairs 150 and 151 are arranged to be close to each other.

As illustrated in FIG. 3B, the input signals Vi+_u and Vi−_u are differential signals the level of which changes. In the following description, the level of the input signals Vi+_d and Vi−_d does not change for simplicity of the description.

Since the level of the input signals Vi+_d and Vi−_d does not change, the level of the reception signals Vr+_d and Vr−_d ideally does not change.

However, since the coupler 113*a* is arranged to be close to the coupler 112*a*, electric field coupling between the couplers 113*a* and 112*a* is dominant. Consequently, as illustrated in FIG. 3B, the coupler 113*a* receives the reception signal Vr+_d that has an edge extending upward and obtained by inexact differential of the input signal Vi+_u of the coupler 112*a* using electric field coupling to the coupler 112*a*.

Similarly, since the coupler 113*b* is arranged to be close to the coupler 112*b*, electric field coupling between the couplers 113*b* and 112*b* is dominant. Consequently, as illustrated in FIG. 3B, the coupler 113*b* receives the reception signal Vr−_d that has an edge extending upward and obtained by inexact differential of the input signal Vi−_u of the coupler 112*b* using electric field coupling to the coupler 112*b*.

As illustrated in FIG. 3B, the reception signal Vr_d is a signal of (Vr+_d)−(Vr−_d) and has a large noise waveform. The waveform of the reception signal Vr_d is an interference waveform (noise) and causes a communication error or communication inability.

The transformation circuit 114 compares the reception signal Vr_d obtained by subtracting the reception signal Vr−_d from the reception signal Vr+_d and a threshold and outputs the output signals Vo. The transformation circuit 114 outputs mistaken binary output signals Vo because the reception signal Vr_d of the noise is larger than the threshold, and the level of the output signals Vo changes. This results in a communication error.

The couplers 112*a*, 112*b*, 113*a*, and 113*b* are described above. The same communication interference occurs in the couplers 122*a*, 122*b*, 123*a*, and 123*b*. When the coupler pair 150 and the coupler pair 151 are thus close to each other, and electric field coupling occurs between the coupler pair 150 and the coupler pair 151, a noise is made, and this causes the communication error. However, a large space is needed to separate the coupler pair 150 and the coupler pair 151 from each other, and the size of the wireless communication modules 110 and 120 increases, which is a demerit.

Also, a large space is needed to dispose a ground line between the coupler pair 150 and the coupler pair 151, and the size of the wireless communication modules 110 and 120 increases, which is a demerit.

Figures 4A, 4B:
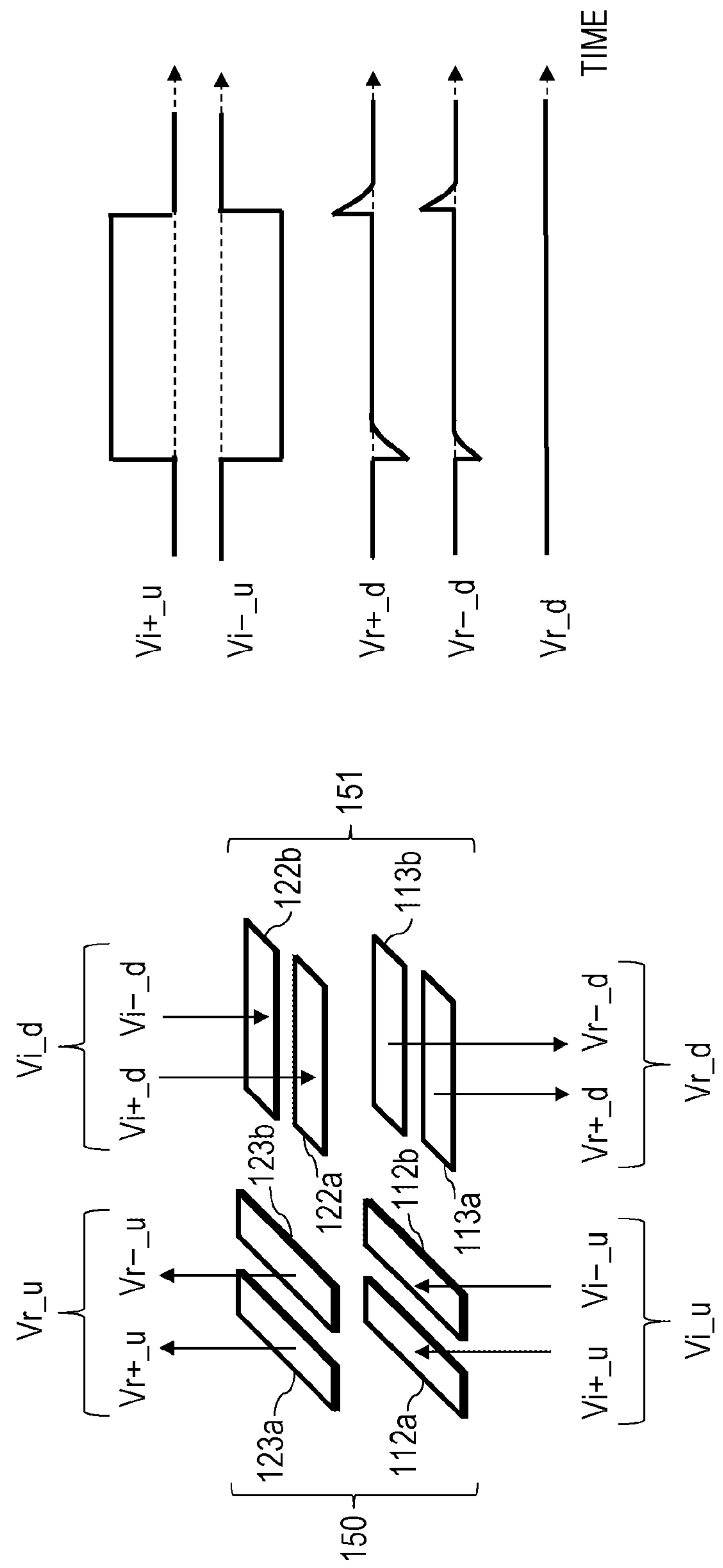
FIG. 4A and FIG. 4B illustrate effects of coupler arrangement.

According to the present embodiment, the coupler arrangement illustrated in FIG. 4A enables the coupler pair 150 and the coupler pair 151 to be arranged to be close to each other and inhibits communication interference from occurring to solve the above problem. Consequently, the size of the wireless communication modules 110 and 120 can be decreased.

FIG. 4A and FIG. 4B illustrate the effects of the arrangement of the couplers 112*a*, 112*b*, 113*a*, 113*b*, 122*a*, 122*b*, 123*a*, and 123*b* according to the present embodiment. FIG. 4A illustrates an example of the arrangement of the couplers 112*a*, 112*b*, 113*a*, 113*b*, 122*a*, 122*b*, 123*a*, and 123*b* according to the present embodiment. FIG. 4B illustrates the waveform of a signal in order to describe the effect of the arrangement of the couplers in FIG. 4A to inhibit the communication interference.

The couplers 112*a*, 112*b*, 113*a*, 113*b*, 122*a*, 122*b*, 123*a*, and 123*b* are rectangular conductors. The longitudinal directions of the couplers 112*a*, 112*b*, 123*a*, and 123*b* are parallel to each other. The longitudinal directions of the couplers 113*a*, 113*b*, 122*a*, and 122*b* are parallel to each other. The longitudinal direction of the coupler pair 150 and the longitudinal direction of the coupler pair 151 are perpendicular to each other. That is, the longitudinal directions of the couplers 112*a*, 112*b*, 123*a*, and 123*b* are perpendicular to the longitudinal directions of the couplers 113*a*, 113*b*, 122*a*, and 122*b*. It suffices that the longitudinal directions of the couplers 112*a*, 112*b*, 123*a*, and 123*b* are substantially perpendicular to the longitudinal directions of the couplers 113*a*, 113*b*, 122*a*, and 122*b*. The coupler pairs 150 and 151 are arranged to be close to each other.

As illustrated in FIG. 4B, the input signals Vi+_u and Vi−_u are differential signals the level of which changes. In the following description, the level of the input signals Vi+_d and Vi−_d does not change for simplicity of the description.

Since the level of the input signals Vi+_d and Vi−_d does not change, the level of the reception signals Vr+_d and Vr−_d ideally does not change.

However, since the coupler 113*a* is arranged to be close to the coupler 112*b*, electric field coupling between the couplers 113*a* and 112*b* is dominant. Consequently, as illustrated in FIG. 4B, the coupler 113*a* receives the reception signal Vr+_d that has an edge extending upward and obtained by inexact differential of the input signal Vi−_u of the coupler 112*b* using electric field coupling to the coupler 112*b*.

Similarly, since the coupler 113*b* is arranged to be close to the coupler 112*b*, electric field coupling between the couplers 113*b* and 112*b* is dominant. Consequently, as illustrated in FIG. 4B, the coupler 113*b* receives the reception signal Vr−_d that has an edge extending upward and obtained by inexact differential of the input signal Vi−_u of the coupler 112*b* using electric field coupling to the coupler 112*b*.

As illustrated in FIG. 4B, the reception signal Vr_d is a signal of (Vr+_d)−(Vr−_d) and exhibits substantially 0 [V]. In the waveform of the reception signal Vr_d, interference waveform (noise) is inhibited, and a communication error or communication inability can be prevented.

The transformation circuit 114 compares the reception signal Vr_d obtained by subtracting the reception signal Vr−_d from the reception signal Vr+_d and a threshold and outputs the output signals Vo. The transformation circuit 114 can output correct binary signals as the output signals Vo because the reception signal Vr_d is smaller than the threshold. This prevents a communication error.

The couplers 112*a*, 112*b*, 113*a*, and 113*b* are described above. Also, the couplers 122*a*, 122*b*, 123*a*, and 123*b* can inhibit the same communication interference. The above arrangement such that the longitudinal direction of the coupler pair 150 and the longitudinal direction of the coupler pair 151 are perpendicular to each other enables the coupler pair 150 and the coupler pair 151 to be arranged to be close to each other and inhibits communication interference from occurring. Consequently, the size of the wireless communication modules 110 and 120 can be decreased.

Figure 5A:
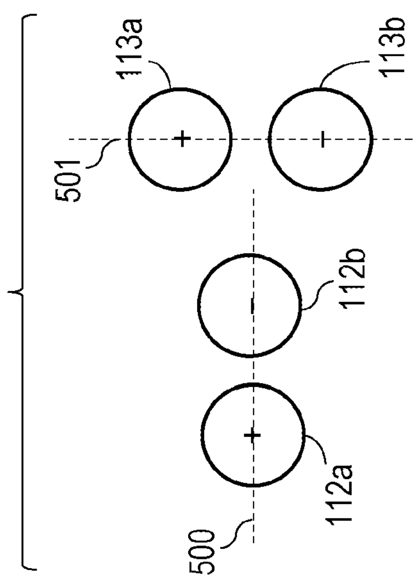
FIG. 5A to FIG. 5E illustrate other coupler structures according to one embodiment.

In FIG. 4A, the couplers 112*a*, 112*b*, 113*a*, 113*b*, 122*a*, 122*b*, 123*a*, and 123*b* are rectangular but are not limited thereto. The shape thereof is not limited provided that electric field coupling occurs. For example, as illustrated in FIG. 5A, the shape of the couplers 112*a*, 112*b*, 113*a*, 113*b*, 122*a*, 122*b*, 123*a*, and 123*b* may be circular or another shape (a trapezoidal shape or a polygonal shape). The shape and the size of the couplers for transmission may not be the same as those of the couplers for reception. For example, the couplers 112*a* and 112*b* may be rectangular, and the couplers 122*a* and 122*b* may be circular.

The couplers 112*a*, 112*b*, 113*a*, and 113*b* in FIG. 5A differ from the couplers 112*a*, 112*b*, 113*a*, and 113*b* in FIG. 4A only in shape. The shape of the couplers 112*a*, 112*b*, 113*a*, and 113*b* in FIG. 5A is circular. Similarly, the shape of the couplers 122*a*, 122*b*, 123*a*, and 123*b* is circular.

In FIG. 4A and FIG. 5A, a straight line 500 that connects the centroid of the coupler 112*a* and the centroid of the coupler 112*b* to each other is substantially perpendicular to a straight line 501 that connects the centroid of the coupler 113*a* and the centroid of the coupler 113*b* to each other. Similarly, a straight line that connects the centroid of the coupler 122*a* and the centroid of the coupler 122*b* to each other is substantially perpendicular to a straight line that connects the centroid of the coupler 123*a* and the centroid of the coupler 123*b* to each other.

Being substantially perpendicular is not a limitation. It suffices that the straight line 500 that connects the centroid of the coupler 112*a* and the centroid of the coupler 112*b* to each other is not parallel to the straight line 501 that connects the centroid of the coupler 113*a* and the centroid of the coupler 113*b* to each other. Similarly, it suffices that the straight line that connects the centroid of the coupler 122*a* and the centroid of the coupler 122*b* to each other is not parallel to the straight line that connects the centroid of the coupler 123*a* and the centroid of the coupler 123*b* to each other.

Figure 5B:
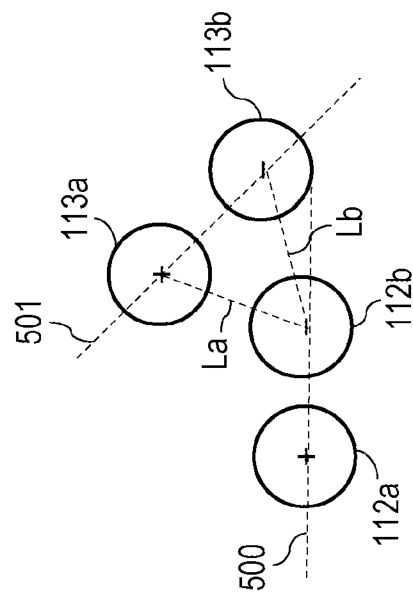

FIG. 5B illustrates another example of an arrangement of the couplers 112*a*, 112*b*, 113*a*, and 113*b*. The couplers 112*a*, 112*b*, 113*a*, and 113*b* are circular. Similarly, the couplers 122*a*, 122*b*, 123*a*, and 113*b* are circular. The straight line 500 that connects the centroid of the coupler 112*a* and the centroid of the coupler 112*b* to each other is not parallel to the straight line 501 that connects the centroid of the coupler 113*a* and the centroid of the coupler 113*b* to each other. Similarly, the straight line that connects the centroid of the coupler 122*a* and the centroid of the coupler 122*b* to each other is not parallel to the straight line that connects the centroid of the coupler 123*a* and the centroid of the coupler 123*b* to each other.

In FIG. 5A and FIG. 5B, a distance La between the centroid of the coupler 112*b* and the centroid of the coupler 113*a* is substantially equal to a distance Lb between the centroid of the coupler 112*b* and the centroid of the coupler 113*b*. Consequently, the degree of electric field coupling between the coupler 112*b* and the coupler 113*a* is substantially equal to the degree of electric field coupling between the coupler 112*b* and the coupler 113*b*.

Similarly, a distance La between the centroid of the coupler 123*b* and the centroid of the coupler 122*a* is substantially equal to a distance Lb between the centroid of the coupler 123*b* and the centroid of the coupler 122*b*. Consequently, the degree of electric field coupling between the coupler 123*b* and the coupler 122*a* is substantially equal to the degree of electric field coupling between the coupler 123*b* and the coupler 122*b*.

In FIG. 5A, a distance between the centroid of the coupler 112*a* and the centroid of the coupler 113*a* is substantially equal to a distance between the centroid of the coupler 112*a* and the centroid of the coupler 113*b*. Consequently, the degree of electric field coupling between the coupler 112*a* and the coupler 113*a* is substantially equal to the degree of electric field coupling between the coupler 112*a* and the coupler 113*b*.

Similarly, a distance between the centroid of the coupler 123*a* and the centroid of the coupler 122*a* is substantially equal to a distance between the centroid of the coupler 123*a* and the centroid of the coupler 122*b*. Consequently, the degree of electric field coupling between the coupler 123*a* and the coupler 122*a* is substantially equal to the degree of electric field coupling between the coupler 123*a* and the coupler 122*b*.

In an example described herein, La and Lb are substantially equal to each other. This is not a limitation. The effect of inhibiting interference can be achieved provided that a difference between La and Lb is equal to or less than a predetermined value. For example, the difference between La and Lb may be less than the widths of the coupler 113*a* and the coupler 113*b*. The same is true for the relationship between the distance between the centroid of the coupler 112*a* and the centroid of the coupler 113*a* and the distance between the centroid of the coupler 112*a* and the centroid of the coupler 113*b*.

The coupler 113*a* is closer than the coupler 112*a* to the coupler 112*b*. The coupler 113*b* is closer than the coupler 112*a* to the coupler 112*b*.

Similarly, the coupler 122*a* is closer than the coupler 123*a* to the coupler 123*b*. The coupler 122*b* is closer than the coupler 123*a* to the coupler 123*b*.

Figure 5C:
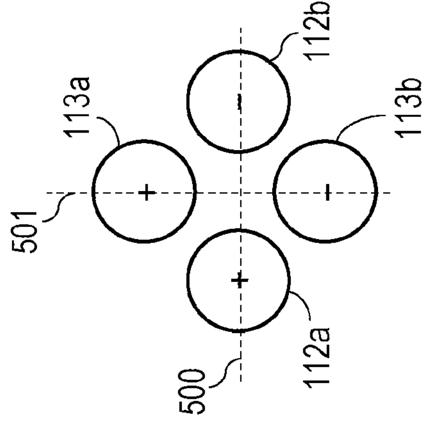

FIG. 5C illustrates another example of the arrangement of the couplers 112*a*, 112*b*, 113*a*, and 113*b*. The couplers 112*a*, 112*b*, 113*a*, and 113*b* are circular. Similarly, the couplers 122*a*, 122*b*, 123*a*, and 113*b* are circular. The straight line 500 that connects the centroid of the coupler 112*a* and the centroid of the coupler 112*b* to each other is not parallel to the straight line 501 that connects the centroid of the coupler 113*a* and the centroid of the coupler 113*b* to each other. Similarly, the straight line that connects the centroid of the coupler 122*a* and the centroid of the coupler 122*b* to each other is not parallel to the straight line that connects the centroid of the coupler 123*a* and the centroid of the coupler 123*b* to each other. The straight line 500 is substantially perpendicular to the straight line 501. An intersection point between the straight line 500 and the straight line 501 is located inside a quadrangle that connects the centroid of the coupler 112*a*, the centroid of the coupler 112*b*, the centroid of the coupler 113*a*, and the centroid of the coupler 113*b* to each other.

In the above description, the couplers 112*a* and 112*b* transmit the differential signals, and the couplers 113*a* and 113*b* receive the differential signals. However, this is not a limitation. The couplers 112*a* and 112*b* may transmit single-ended signals, and the couplers 113*a* and 113*b* may receive differential signals. The couplers 112*a* and 112*b* may transmit differential signals, and the couplers 113*a* and 113*b* may receive single-ended signals.

Figure 5D:
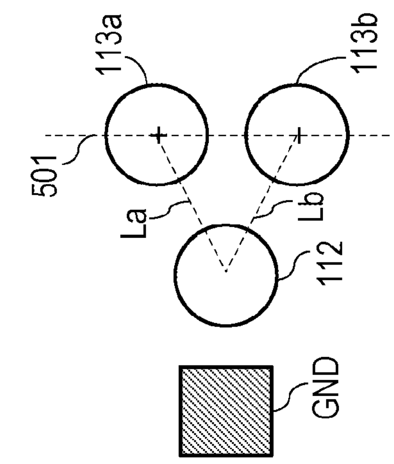
Figure 5E:
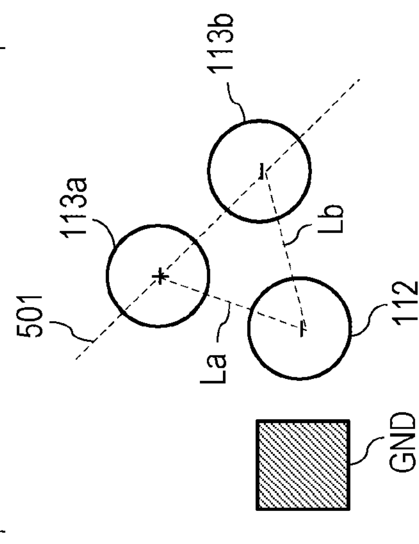

FIG. 5D and FIG. 5E illustrate an example of an arrangement of a coupler 112 and the couplers 113*a* and 113*b*. In FIG. 5D, a ground conductor GND and the coupler 112 for communication of single-ended signals are disposed instead of the couplers 112*a* and 112*b* for communication of the differential signals in FIG. 5A. In FIG. 5E, the ground conductor GND and the coupler 112 for communication of single-ended signals are disposed instead of the couplers 112*a* and 112*b* for communication of the differential signals in FIG. 5B. The couplers 113*a* and 113*b* in FIG. 5D and FIG. 5E are the same as those in FIG. 5A and FIG. 5B. The ground conductor GND has a ground electric potential and is close to the coupler 112. The coupler 112 is a conductor that has a reference electric potential for transmission of a single-ended signal. An example of the coupler 112 is a circular conductor and receives a single-ended signal from the transceiver circuit 111.

Similarly, a coupler 123 and a ground conductor GND for communication of single-ended signals are disposed instead of the couplers 123*a* and 123*b* for communication of the differential signals. An example of the coupler 123 is a circular conductor and outputs a single-ended signal to the transformation circuit 124.

The coupler 112 wirelessly transmits the single-ended signal to the coupler 123 on the outside therefrom using electric field coupling with the electric potential of the ground conductor GND in the wireless communication module 110 and the electric potential of the ground conductor GND in the wireless communication module 120 used as reference electric potentials. The coupler 123 wirelessly receives the single-ended signal from the coupler 112 on the outside therefrom using electric field coupling with the electric potential of the ground conductor GND in the wireless communication module 120 and the electric potential of the ground conductor GND in the wireless communication module 110 used as reference electric potentials.

The centroid of the coupler 112 is not located on the straight line 501 that connects the centroid of the coupler 113*a* and the centroid of the coupler 113*b* to each other. A distance La between the centroid of the coupler 112 and the centroid of the coupler 113*a* is substantially equal to a distance Lb between the centroid of the coupler 112 and the centroid of the coupler 113*b*. Consequently, the degree of electric field coupling between the coupler 112 and the coupler 113*a* is substantially equal to the degree of electric field coupling between the coupler 112 and the coupler 113*b*. This coupler arrangement enables the coupler pair 150 and the coupler pair 151 to be arranged to be close to each other.

Similarly, the centroid of the coupler 123 is not located on the straight line that connects the centroid of the coupler 122*a* and the centroid of the coupler 122*b*. A distance between the centroid of the coupler 123 and the centroid of the coupler 122*a* is substantially equal to a distance between the centroid of the coupler 123 and the centroid of the coupler 122*b*. Consequently, the degree of electric field coupling between the coupler 123 and the coupler 122*a* is substantially equal to the degree of electric field coupling between the coupler 123 and the coupler 122*b*.

In the example described above, the transformation circuits 114 and 124 shape the reception signals Vr in a differential waveform and outputs the output signals Vo that are binary digital signals that represent "1" or "0" but are not limited thereto. The wireless communication system 100 can be used for any wireless method (such as a method of RF modulation) provided that electric field coupling between the couplers is used.

In the above description, the wireless communication system 100 according to the present embodiment is used for two-way communication in upstream and downstream directions but is not limited thereto. For example, the coupler arrangement described according to the present embodiment can be used for one-way communication in an upstream direction of two lanes (two systems) or in a downstream direction of two lanes by using the coupler pair 150 and the coupler pair 151 for communication in the same direction. The present embodiment is not limited to the communication of the two lanes and can be used as a communication system for two-way communication or one-way communication by performing communication of three or more lanes with three or more coupler pairs.

Figure 6A:
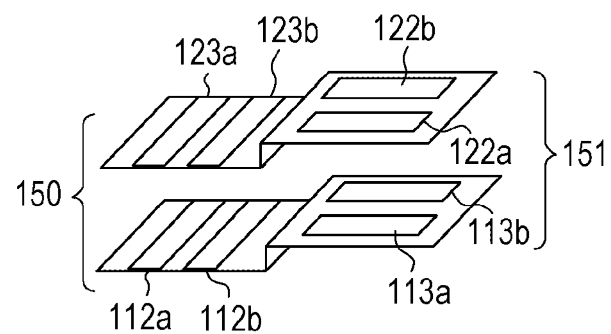
FIG. 6A and FIG. 6B illustrate modifications to the coupler arrangement according to one embodiment.
Figure 6B:
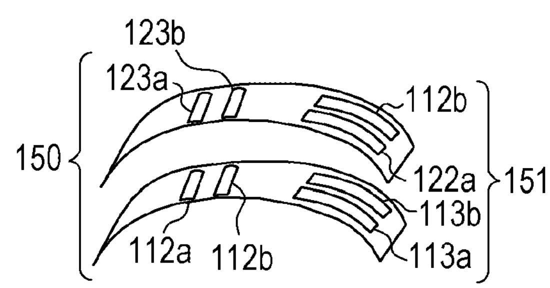

In the description according to the present embodiment, the couplers 112*a*, 112*b*, 113*a*, and 113*b* and the couplers 122*a*, 122*b*, 123*a*, and 123*b* are substantially flush with each other but are not limited thereto. For example, the coupler pairs 150 and 151 may be disposed on planes having different heights as illustrated in FIG. 6A or may be disposed on a curved plane as illustrated in FIG. 6B. The arrangement of the coupler pair 150 and the coupler pair 151 that have different heights enables the interference to be further inhibited.

Figure 7A:
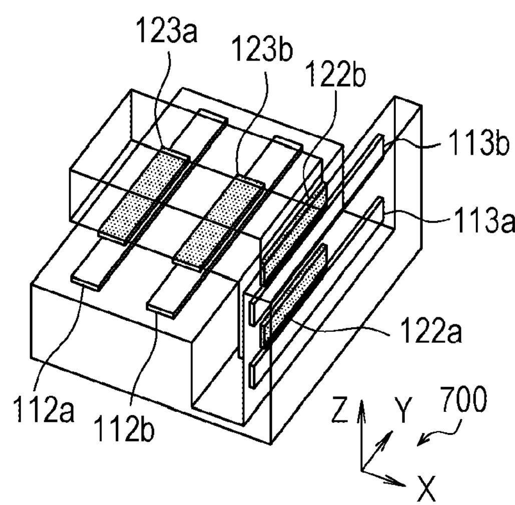
FIG. 7A to FIG. 7C illustrate a three-dimensional coupler arrangement according to one embodiment.
Figure 7B:
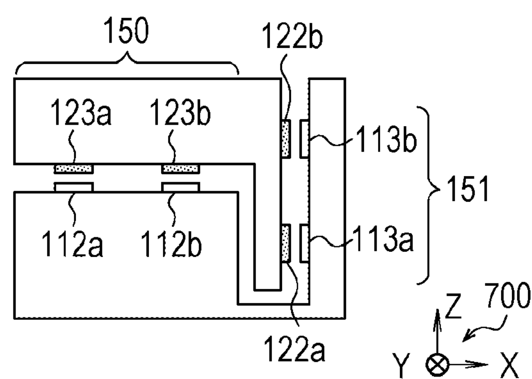
Figure 7C:
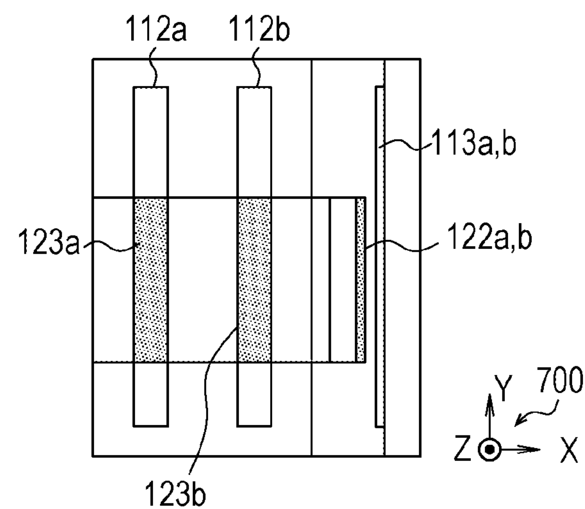

As illustrated in FIG. 7A to FIG. 7C, the coupler pair 150 and the coupler pair 151 may be disposed in a three-dimensional arrangement to achieve orthogonality for inhibiting the interference. FIG. 7A is a perspective view of the couplers 112*a*, 112*b*, 113*a*, 113*b*, 122*a*, 122*b*, 123*a*, and 113*b* in an example of three-dimensional arrangement. FIG. 7B is a diagram viewed in the direction of a Y-axis of a coordinate system 700 that is defined by a X-axis, the Y-axis, and a Z-axis that are perpendicular to each other. FIG. 7C is a diagram viewed in the direction of the Z-axis. In this three-dimensional arrangement, an effect of an electromagnetic field from one of the coupler pairs on the other coupler pair is at least partly canceled out, and communication interference can be inhibited.

For example, the lengths of the couplers 112*a*, 112*b*, 113*a*, and 113*b* (a first coupler set included in the wireless communication module 110) in the direction of the Y-axis are longer than those of the couplers 122*a*, 122*b*, 123*a*, and 123*b* (a second coupler set included in the wireless communication module 120). The first coupler set, or the second coupler set, or both may be capable of moving in the direction of the Y-axis. With this structure, electric field coupling between the coupler pairs 150 and 151 is maintained, the relative positions of the wireless communication module 110 and the wireless communication module 120 can be changed to predetermined positions, and communication interference between the coupler pairs 150 and 151 can be inhibited. That is, wireless communication between the wireless communication module 110 and the wireless communication module 120 can be performed, and in this state, the wireless communication module 110, or the wireless communication module 120, or both can be moved in a predetermined direction. For example, a driving force of a movement controller by using a motor can be used for movement of the wireless communication modules.

The above embodiment is described by way of example to carry out the present invention. The technical scope of the present invention is not to be interpreted as being limited by the scope of the above embodiment. That is, features of the present disclosure can be carried out by various embodiments without departing from the technical concept or the principal features described in the present disclosure.

According to the above embodiment, communication interference of a communication apparatus that uses electrodes for wireless communication using electric field coupling can be inhibited, and the size thereof can be decreased.

While various embodiments have been described, it is to be understood that the invention is not limited to the disclosed embodiments. The scope of the following claims is to be accorded the broadest interpretation so as to encompass all appropriate modifications and equivalent structures and functions.

What is claimed is:

1. A wireless communication apparatus comprising:

a first conductor having four or more vertices and a second conductor having four or more vertices, the first and second conductor functioning as a set of electrodes for wireless communication of a differential signal using electric field coupling, between the wireless communication apparatus and another wireless communication apparatus; and a third conductor having four or more vertices and a fourth conductor having four or more vertices, the third and fourth conductors functioning as another set of electrodes for wireless communication using electric field coupling, between the wireless communication apparatus and the another wireless communication apparatus, wherein a degree of coupling between the first conductor and the third conductor is larger than a degree of coupling between the first conductor and the fourth conductor, wherein a degree of coupling between the second conductor and the third conductor is larger than a degree of coupling between the second conductor and the fourth conductor, and wherein a first straight line connecting a centroid of the first conductor and a centroid of the second conductor is not parallel to a second straight line connecting a centroid of the third conductor and a centroid of the fourth conductor.

2. The wireless communication apparatus according to claim 1, wherein the degree of coupling between the first conductor and the third conductor and the degree of coupling between the second conductor and the third conductor are substantially equal to each other.

3. The wireless communication apparatus according to claim 1, wherein the degree of coupling between the first conductor and the fourth conductor and the degree of coupling between the second conductor and the fourth conductor are substantially equal to each other.

4. The wireless communication apparatus according to claim 1, wherein a first distance between the centroid of the first conductor and the centroid of the third conductor is less than a third distance between the centroid of the first conductor and the centroid of the fourth conductor, and wherein a second distance between the centroid of the second conductor and the centroid of the third conductor is less than a fourth distance between the centroid of the second conductor and the centroid of the fourth conductor.

5. The wireless communication apparatus according to claim 4, wherein the first distance and the second distance are substantially equal to each other, and wherein the third distance and the fourth distance are substantially equal to each other.

6. The wireless communication apparatus according to claim 1, wherein the first conductor, the second conductor, the third conductor, and the fourth conductor are disposed on the same substrate.

7. The wireless communication apparatus according to claim 1, wherein the first straight line is substantially perpendicular to a second straight line.

8. The wireless communication apparatus according to claim 1, wherein the second straight line passes between the centroid of the first conductor and the centroid of the second conductor.

9. The wireless communication apparatus according to claim 1, wherein the first conductor and the second conductor are used for performing wireless communication of a first differential signal, and wherein the third conductor and the fourth conductor are used for performing wireless communication of a second differential signal.

10. The wireless communication apparatus according to claim 1, wherein the first conductor and the second conductor are used for performing wireless communication of a differential signal, and wherein the third conductor is used for performing wireless communication of a single-ended signal where an electric potential of the fourth conductor is used as a reference electric potential.

11. The wireless communication apparatus according to claim 1, wherein the first conductor and the second conductor are used by the wireless communication apparatus for wirelessly receiving a signal from the another wireless communication apparatus using electric field coupling, and wherein the third conductor and the fourth conductor are used by the wireless communication apparatus for wirelessly transmitting a signal to the another wireless communication apparatus using electric field coupling.

12. The wireless communication apparatus according to claim 1, wherein the first conductor and the second conductor are used by the wireless communication apparatus for wirelessly transmitting a signal to the another wireless communication apparatus using electric field coupling, and wherein the third conductor and the fourth conductor are used by the wireless communication apparatus for wirelessly transmitting a signal to the another wireless communication apparatus using electric field coupling.

13. A communication method implemented using a wireless communication apparatus that includes a first conductor having four or more vertices, a second conductor having four or more vertices, a third conductor having four or more vertices, and a fourth conductor having four or more vertices, the communication method comprising:

performing, using the first conductor and the second conductor as a set of electrodes, wireless communication of a differential signal using electric field coupling, between the wireless communication apparatus and another wireless communication apparatus; and performing, using the third conductor and the fourth conductor as another set of electrodes, wireless communication of a differential signal using electric field coupling, between the wireless communication apparatus and the another wireless communication apparatus, wherein a degree of coupling between the first conductor and the third conductor is larger than a degree of coupling between the first conductor and the fourth conductor, wherein a degree of coupling between the second conductor and the third conductor is larger than a degree of coupling between the second conductor and the fourth conductor, and wherein a first straight line connecting a centroid of the first conductor and a centroid of the second conductor is not parallel to a second straight line connecting a centroid of the third conductor and a centroid of the fourth conductor.

14. The communication method according to claim 13, wherein the wireless communication performed by using the first conductor and the second conductor is wireless communication of a first differential signal, and wherein the wireless communication performed by using the third conductor and the fourth conductor is wireless communication of a second differential signal.

15. The communication method according to claim 13, wherein the wireless communication performed by using the first conductor and the second conductor is communication of the wireless communication apparatus that wirelessly receives a signal from the another wireless communication apparatus using electric field coupling, and wherein the wireless communication performed by using the third conductor and the fourth conductor is communication of the wireless communication apparatus that wirelessly transmits a signal to the another wireless communication apparatus using electric field coupling.

* * * * *